Patented Aug. 13, 1940

2,211,119

UNITED STATES PATENT OFFICE 2,211,119

METHOD OF RECOVERY OF VANADIUM FROM ACID SOLUTIONS

Arthur W. Hixson, Leonia, N. J., and Ralph Miller, New York, N. Y., assignors to The Chemical Foundation, Incorporated, a corporation of Delaware No Drawing. Application July 17, 1937, Serial No. 154,188

20 Claims. (Cl. 23—23)

This invention relates to the recovery of metals from acid solutions, more particularly to the recovery of vanadium from phosphoric acid solutions.

The present invention is based upon the discovery that it is possible to extract certain metal compounds, from systems containing them, by utilizing the principle of selective or preferential solubility in organic solvents. For purposes of illustration, the invention will be described with respect to the recovery of compounds of a valuable fifth group metal, such as vanadium, from a source heretofore known to contain this metal but in which source it occurred in such relatively small amounts as to be considered uneconomical to recover. From a consideration of the principles involved in this particular, and illustrative, extraction, those skilled in the art will readily appreciate the availability and applicability of the invention to other analogous circumstances, that is to say, to the extraction of metallic values from equivalent systems.

As indicating the striking simplicity and efficacy of the present invention, a method will be described for extracting the vanadium content of phosphoric acid solutions produced from vanadium-containing phosphates.

As those skilled in the art know, the fertilizer industry presents one of the more important outlets for the mineral acids, such as sulphuric and phosphoric acids. In the earlier days of this industry, the great bulk of the phosphate fertilizer was produced as superphosphate. This was the product obtained by treating phosphate rock, such as Florida and Tennessee pebble phosphate, with an excess of sulphuric acid to produce "available" phosphate (i. e., mono and dicalcium phosphates) and calcium sulphate. In this product, the available phosphate constituted approximately 16 per cent. of the entire mass, the remainder being a substantially useless and inert ingredient.

As the art advanced, successful attempts were made to increase the percentage of the valuable phosphate ingredient in the finished product. As a result of these efforts, a considerable proportion of the phosphatic fertilizer now produced in this country is in the form of the "double" or "triple" superphosphates, so termed because they contain roughly about double or triple the amount of available phosphate usually present in the superphosphate.

Such double and triple superphosphates are produced by acidulating phosphate rock with phosphoric acid, rather than with sulphuric acid. The development of these concentrated phosphatic fertilizers correspondingly increased the demand for phosphoric acid. While the bulk of the phosphoric acid is manufactured from the Florida and Tennessee phosphates, a very large quantity is produced from the western phosphate deposits. Some of this western phosphate rock, occurring for example in Wyoming, Utah, Idaho, and Montana, contains an appreciable percentage of vanadium. In the production of phosphoric acid from such vanadium-containing phosphates by the wet method (i. e., by acidulation of the phosphate with dilute sulphuric acid), the vanadium content of the rock largely appears in the final phosphoric acid solution. This vanadium is present in such phosphoric acid solutions in economically recoverable amounts.

Typical examples of phosphoric acid, produced from such vanadium-containing deposits, will show, upon analysis, approximately .3 per cent. by weight, of vanadium. When it is remembered that, at the present market, vanadium pentoxide in concentrated ore costs about 28 cents a pound, and that fused vanadium pentoxide of a relatively high purity brings over a dollar a pound, it will be apparent that the recovery of vanadium from this source is economically feasible.

The present invention, as noted above, relates to an economical recovery of vanadium or equivalent metal values by an extraction method which is as economical as it is effective. As will be seen more fully hereinafter, the treatment involves essentially the conversion of the vanadium content in the acid to a higher oxide and the extraction of a fraction or all of such oxide by means of a selective organic solvent. The extract may be treated by distillation or displacement methods, to separate the solvent from the metal value, and the solvent may be reemployed in the process. Since the solvent is thus employed in a recovery cycle, and since the only other reagent employed is a cheap oxidizing agent, the operative costs are of the low order required for the recovery of inorganics.

It has been known that the phosphoric acid produced from the sources mentioned does contain vanadium. In fact, such acid has a characteristic green color due to the presence of the vanadium. This color is objectionable for some uses of the acid, particularly for the manufacture of food phosphates. For this reason, it has been proposed in the past to separate the vanadium from the acid. Thus, a process has been suggested which comprises the treatment of the acid with sodium ferrocyanide to precipitate the corresponding vanadium salt, followed by the digestion of the precipitate with caustic to regenerate the sodium ferrocyanide. The present invention, as will be observed, is based on an entirely different mode of operation from that involved in the prior suggested method.

As explained in our earlier application, Serial No. 149,200, filed June 19, 1937, we have discovered that the higher oxide of vanadium, particularly vanadium pentoxide, is substantially insoluble in phosphoric acid. As there explained, it is thus possible to separate and recover an appreciable amount of the original vanadium content of the acid by converting the vanadium to the pentavalent state and then separating the pentoxide by suitable methods, such as filtering, centrifuging, decanting, and the like.

It has now been found that certain organic compounds possess the ability to selectively, and practically quantitatively, extract vanadium in the pentavalent state from phosphoric acid solutions containing it. A typical example of such an effective extractant is isopropyl ether.

These characteristics of vanadium pentoxide thus permit the utilization of two distinct processes for the recovery of vanadium from phosphoric acid solutions.

In one method, the vanadium content of the acid may be oxidized to the pentavalent state by adding a suitable oxidizing agent and heating to an elevated temperature. In these circumstances, the vanadium is converted to vanadium pentoxide. By employing a simple separation method, as more particularly explained in the prior application, over one-half of the vanadium content may be separated from the solution. The remaining vanadium pentoxide may be recovered, practically quantitatively, by extraction with a suitable solvent such as isopropyl ether.

In lieu of such two-stage method, the process may be carried out in such a way that the vanadium content is oxidized to the pentavalent state, after which a selective solvent may be added to the mass to selectively extract the pentoxide. The solvent layer or extract may then be segregated and distilled to remove the solvent, which is preferably recycled and reemployed in the process. As will be appreciated, since isopropyl ether boils at 68.7° C., heat requirements for the recovery cycle are very low. In another method, the extract may be contacted with another liquid, such as water, to extract the metal value from the organic solvent which latter may be recycled in the system.

The principles of the invention will be more readily appreciated from a consideration of specific treatments carried out under the inventive concept.

A typical sample of phosphoric acid, produced from western phosphate, was analyzed and found to contain 0.26 per cent., by weight, of vanadium and 53 per cent. of phosphorous pentoxide. Calculated as $V_2O_5$, the ratio of vanadium to $P_2O_5$ was 0.9 per cent. A test sample of this was diluted and agitated with potassium permanganate. The acid was then extracted several times with isopropyl ether and the extract was distilled, the evolved vapors being condensed and recovered. It was found that after distilling over the ether, a bright yellow residue remained in the distilling flask. This residue was dissolved in hydrochloric acid and, when treated with hydrogen peroxide, developed the deep red color proving the presence of vanadium.

To determine the specificity of vanadium in the pentavalent state with respect to extraction by the particular solvent, a sample of the phosphoric acid which had not been subjected to oxidation was extracted with isopropyl ether. It was found that no vanadium entered the ether layer. It thus clearly appeared that the amenability to extraction by a given solvent was a specific characteristic of the particular compound.

The invention will be more readily understood by a consideration of different specific processes which may be carried out.

As intimated hereinbefore, according to one method, phosphoric acid solutions containing the vanadium may be subjected to oxidizing conditions so as to insure the formation of the substantially insoluble pentoxide. A quantity of this pentoxide may be recovered by allowing a precipitate to settle and then separating it by any suitable method, such as by filtering, decanting, and the like. Thereafter, the solution which still contains some vanadium may be treated with selective solvent to extract the residue of the vanadium.

The following example is indicative of the efficacy of such a process. To a sample of phosphoric acid, of the analysis heretofore given, was added an excess of potassium persulphate. The acid was diluted and heated to a temperature of substantially 120° C. The solution was allowed to stand overnight and the precipitate, which formed, was filtered off. Upon analysis, it was found that this precipitate contained .2 gram of vanadium. The filtrate was analyzed and was found to contain .16 gram of vanadium. This filtrate was then extracted several times with isopropyl ether; the extract was distilled and the solid residue analyzed. It was found that the ether extraction removed the residual vanadium in the filtrate substantially completely.

As indicated above, according to another method of procedure, the preliminary removal of the insoluble fraction of the vanadium pentoxide may be dispensed with and the vanadium recovered by the sole expedient of extraction with the organic solvent. In operating under this method, a suitable oxidizing agent is added to the diluted acid and the solution heated to an elevated temperature so as to insure the conversion of the vanadium to the pentavalent state. Thereafter, the solution may be extracted in the manner described with a suitable organic solvent to selectively remove the vanadium.

It will be understood that, in carrying out the extraction step, the specific conditions of the treatment will be regulated and controlled, as understood by those skilled in the art, with respect to the particular organic solvent which is utilized. In any particular case, such factors as the extraction temperature, the method of contacting the acid and solvent, the acid concentration and the volume ratio of the solvent to the acid, may be severally modified to secure the most efficient operation with the solvent chosen. The extraction operations may be carried out in a suitable vessel provided with heating and agitating means, so as to insure an initial intimate or homogeneous mixture of the solvent and the acid. The apparatus in which the extraction is carried out is provided with means to insure the withdrawal of the segregated organic solvent layer and passage of this to the distilling apparatus. Such features of operative procedure will be understood by those skilled in the art.

It is to be borne in mind that the distribution coefficient of the distributed substance (i. e., the vanadium) in a given system may be modified so as to increase the concentration of the vanadium in the solvent phase. For example, it is found that the presence of substances, such as iron, favorably influences the distribution coefficient and insures a better extraction.

It is to be observed at this point that, in treating phosphoric acid solutions of the character described, the precipitate which is produced by the oxidation treatment may not consist of pure vanadium pentoxide, but does contain some iron. The vanadium and iron contents of the precipitate may be separated by suitable methods, such as those described in copending application Serial No. 149,200, filed June 19, 1937.

A very interesting feature of the present invention is the fact that the principle of solvent extraction can be utilized to purify the vanadium pentoxide by freeing it from iron, and, paradoxically, by extracting the iron by means of the same selective solvent, i. e., isopropyl ether. This may be done by converting the vanadium from the pentavalent state to the tetravalent state. In these circumstances, the selective solvent selectively extracts the iron content, leaving the purified vanadium oxide. Thus, by employing one type of solvent, differential extractions may be effected. By way of explanation and example of this type of procedure, the following treatment may be effected. The phosphoric acid solution may be oxidized with a suitable oxidizing agent and at the requisite temperatures in the manner already described. The precipitate which is formed may be separated by suitable methods, such as centrifuging, filtering, and the like. This precipitate, which, as will be appreciated, contains both oxidized vanadium and iron, is then preferably dissolved in hydrochloric acid and heated so as to convert the vanadium from the pentavalent to the tetravalent state, while maintaining the iron in the ferric condition. This solution may then be extracted with isopropyl ether. Upon segregation of the extract layer, and distillation, it is found that substantially 99 per cent. of the iron enters the ether layer. With a suitable number of successive extractions, the iron can be substantially quantitatively removed from the solution. The acid layer, which contains the tetravalent vanadium, may then be evaporated to dryness, while recovering the hydrochloric acid. In these circumstances, it is found that the vanadium is practically completely recovered in the residue.

As explained in the prior application referred to, the initial precipitate, containing vanadium and iron, may be subjected to any suitable type of treatment, such as reduction, so as to produce ferro-vanadium concentrate, particularly useful in the metallurgical fields.

It will be understood that, since the broad treatment described herein involves oxidation of the vanadium content to the pentavalent state, this may be effected by utilizing any suitable oxidizing agent or method. Thus, in lieu of the particular agents mentioned, others may be employed such as: sodium and potassium chlorate, ammonium persulphate, hydrogen peroxide, manganese dioxide, oxides of nitrogen, nitric acid, and the like. Instead of employing an oxidizing agent, the desired conversion may be achieved by electrolytic oxidation. The invention contemplates broadly the use of any method of converting the vanadium to the higher valence state. As explained in the earlier application, when it is desired to employ the phosphoric acid solution for the production of fertilizers, it is recommended to use an oxidizing agent which contains an element having potentially available fertilizing value, such as potash and ammonium compounds.

Similarly, while isopropyl ether has been mentioned as an effective solvent for extracting vanadium compounds from acid solutions, it is to be understood that this is given merely as an example of any similarly functioning organic solvent, i. e., one which is capable of preferentially extracting the desired component from the acid solution, and which solvent may be separated from such metal component by simple methods, such as atmospheric or vacuum distillation. It has been found that a wide range of different, specific solvents are available for employment under the invention. Thus, in lieu of isopropyl ether, mentioned in the examples herein, other aliphatic ethers may be utilized, such as ethyl ether and dibutyl ether. Again, the substantially insoluble aliphatic alcohols, such as tertiary amyl alcohol and secondary hexyl alcohol (methyl n.-butyl carbinol) serve effectively for the solvent extraction of vanadium compounds. The aliphatic esters likewise may be employed; it is found, for example, that the following esters operate effectively for the purposes at hand; amyl formate, ethyl acetate, butyl acetate, sec.-hexyl acetate, n.-butyl propionate, and butyl butyrate. Again, aliphatic compounds containing a carbonyl group, such as methyl n. amyl ketone, and methyl isobutyl ketone, function satisfactorily for the desired selective solvent extraction. Similarly, alkyl sulphur compounds, such as diamyl sulphide, may be used. Again, organics containing a nitro group, such as nitromethane, or a nitrile group such as propionitrile may be employed. Likewise, aromatic compounds may be employed, such as: aromatic ethers like phenetole; aromatic aldehydes, such as benzaldehyde; aromatic acid derivatives such as ethyl benzoate, and n.-butyl phthalate; phenolic bodies such as tri-ortho cresyl phosphate. In short, a wide range of different organic compounds may be utilized within the scope of the invention.

It will be noted that the availability of a particular organic compound, for use as a solvent of the type described, may readily empirically be determined. This may be done by oxidizing a diluted sample of the vanadium-containing phosphoric acid with an oxidizing agent, such as sodium chlorate, so as to convert the vanadium to the pentavalent state. It will be found that upon such conversion the acid changes in color from a blue to a definite yellow. The particular organic compound, the availability of which is to be ascertained, may then be agitated with an equal volume of the acid in a suitable vessel, such as a separatory funnel. Upon segregation of the system into layers, it will be found that those organic compounds, which selectively extract the vanadium, will extract some of the color from the acid. The solvent layer may then be separated from the acid and contacted with an equal volume of distilled water, after which the layers may be separated and the water phase tested for vanadium in any suitable manner, as for example, by means of the hydrogen peroxide test. In this manner, those skilled in the art may quickly determine the suitability of a particular organic compound for the desired extraction.

It will be understood in carrying out the invention it is not essential that the vanadium be extracted by means of a single solvent or by employing a single extraction step. Thus, successive extractions may be made, utilizing, if desired, specifically different solvents in the several extractions. Again, in some cases, improved results are secured by effecting the extraction with a solvent phase consisting of a mixture of two or more solvents.

When employing either a single or plural solvent phase, the optimum solvent-acid ratio readily may be determined for any particular acid system which is to be extracted.

As indicated hereinbefore, the vanadium content of phosphoric acid solutions may be recovered by employing a single stage or two-stage process. It will be understood, from a consideration of the mechanism of the reactions involved, that such stages are not necessarily sharply differentiated so as to require separate operative steps. It has been explained that when the vanadium-containing phosphoric acid solution is subjected to the action of an oxidizing agent, so as to convert the vanadium to the pentavalent state, an insoluble precipitate is eventually formed. It was further explained that this precipitate may be removed by simple methods, such as filtration. This precipitate, however, is not an immediate reaction product. When the oxidizing agent is added, a colloidal solution of vanadium is first formed. The sol produced is unstable and in time passes over to the insoluble pentoxide, which slowly precipitates. In ordinary circumstances, most of the vanadium is precipitated out in about three hours. If desired, such precipitate may be allowed to form and may then be removed, after which the filtrate may be extracted with the solvent to recover the remaining vanadium. However, after the vanadium has been oxidized to the pentavalent state, and before the precipitate has formed, the solution may be extracted with the organic solvent to selectively remove the vanadium.

It will have been appreciated that the fundamental concept upon which the present invention is based is the fact that when aqueous solutions, containing dissolved metals in particular valence states, are contacted with selective organic liquids, which are substantially immiscible with the aqueous phase, some of the dissolved metal is taken up in the organic liquid. It has been particularly pointed out that when vanadium, by way of example, is converted to the pentavalent state, it is amenable to extraction by numerous organic solvents.

In the particular illustrative example given, a simple method of separating the solvent from the extracted vanadium was described, namely, simple distillation. It will be understood, however, that this is not the only method of recovering the vanadium from the extract and, as a matter of fact, may not be the method actually employed.

As will be understood by those skilled in the art, the solvent extract may be subjected to different types of treatment for the purpose of separating the vanadium from the solvent and recovering the latter with minimal losses. With this type of process, i. e., solvent extraction, it is theoretically possible to operate in a cyclic method with no losses of the solvent. Actually, of course, there may be some slight loss due to leakage or other mechanical factors or to some slight solubility of the solvent in the acid. The quantity of solvent which is dissolved in the acid in the course of the extraction may be recovered by heating the acid solution, after extraction has taken place, so as to distill off and recover the volatile solvent. Again, the residual selective solvent contained in the extracted acid may be recovered by treating such acid solution with certain organic liquids which preferentially remove or abstract the selective solvent. Yet again, losses of this character, namely, losses by some dissolution of the selective solvent in the acid, may be minimized or eliminated by utilizing, as the extraction medium, a mixture of a selective solvent and a nonselective organic liquid, such second organic liquid being chosen from that class which tends to decrease the solubility of the selective organic solvent in the acid solution. These and other methods of diminishing the solubility of the organic solvent in the acid or recovering such solvent from the acid may be utilized.

Recovery of metal values, such as vanadium, by means of selective solvents, involves essentially three steps, namely, the conversion of the metal value to a predetermined, valence state (i. e., a potentially extractable state), the extraction of such value from aqueous solutions by means of an organic extractant, and the recovery of the metal value from such extractant.

A major desideratum in a selective solvent is a marked affinity for the metal value to be extracted, that is to say, the ability to remove the metal component from the aqueous phase and dissolve it in high concentration in the organic phase. This ability, of course, will differ with different solvents and depends upon the particular characteristics of the solvent in question, more especially upon the distribution coefficient of the metal value in the particular system in which the solvent is used. Similarly, and as already indicated, another factor which governs the choice of the solvent to be employed is its solubility in the aqueous acid solution; the ideal solvent is obviously one which is completely insoluble in the acid and immiscible in water. In any given operation, these criteria of excellence must, of course, be balanced against the economic factors, such as the initial cost of the solvent and the losses incident to its use.

It will be recognized that, in a given system, while a solvent of an inherently high distribution coefficient is especially desirable, the distribution ratio in a system to be extracted may advantageously be modified by adjustment of the hydrogen ion concentration of the system to the optimum value or, again, by the employment of suitable addition agents which tend to increase the concentration of the distributed substance in the solvent phase.

The third step of the procedure, as indicated above, is the recovery of extracted metal value from the extract or organic solvent. This may readily be done by distilling off the solvent and recovering the metal value as a residue. Such a process, however, is expensive as an operative procedure, and even under the best conditions does involve some loss of the solvent.

In further experimentation, it has been found that the recoverable metal value which has been concentrated in the segregated solvent phase may economically be removed without resorting to such a heating method. These improved methods, as distinguished from solvent distillation, which may be considered a physical separation, may be classified as chemical or physicochemical separation methods.

In one such method, it is found that the original fundamental concept may be invoked. In a word, it is found that the metal value may be re-extracted from the solvent phase and into a new phase, preferably an aqueous phase, by invoking the principle of controlled change of valence. For example, in the illustrative case of the recovery of vanadium, the solvent extract which contains the vanadium value may be contacted with plain water, in a suitable vessel. Depending upon the distribution ratio of the metal value between the water and the particular solvent phase, a certain quantity of the metal value will pass into the aqueous phase to establish the equilibrium concentration. This equilibrium may then be displaced by changing the valence of the metal value. In these circumstances, the metal value in the water phase may be rendered substantially insoluble in the organic liquid, so that additional amounts of the metal value can pass to the water phase. It is apparent that, by utilizing this principle of displacement of the distribution equilibrium, the metal values in the solvent phase may be substantially quantitatively removed and by utilizing only minimal amounts of the aqueous extractant. The stripped organic solvent may then be recycled to the first extraction stage and the water extract distilled, or otherwise treated, to recover the metal values in any desired form.

It will be appreciated that such a method may be carried out in a simple manner, utilizing conventional and inexpensive apparatus. For example, in the recovery of vanadium, a predetermined quantity of plain water may be contacted with a given volume of the organic extract in a vessel of any suitable character. The water layer which now contains a certain quantum of the metal value may continuously or intermittently be removed and forced to a second vessel, in which it is treated with a suitable reagent, such as sulphur dioxide, which reduces the vanadium from the pentavalent to the tetravalent state in which latter state, as explained, it is insoluble in the organic solvent. The water phase may then be recycled to the first vessel to again contact with and extract additional vanadium from the solvent. After the water phase has completely exhausted the metal value from the solvent phase, it may be passed to a still to distill off the water, or to a vessel in which it is heated to produce any desired precipitated or reaction product. The stripped organic solvent may be reemployed to extract additional amounts of the original vanadium-containing acid solution.

The solvent extract containing the metal value may be treated by another method to recover such value with minimal loss of the solvent. This method involves the adjustment of the acidity of the extract to an optimum hydrogen ion concentration at which the distribution ratio is displaced markedly in favor of the aqueous phase, so that the metal value, heretofore contained in the organic vehicle, is transferred to the aqueous vehicle.

It will thus be seen that by the simple expedients of effecting a change in the valence of the metal value, contained in the extract, or modifying the acidity of the extract, the metal value may be concentrated in an aqueous phase, from which it may readily and inexpensively be recovered and with substantially no loss of the expensive organic solvent.

It will be observed that these two broad methods may be combined in the one process to achieve a most economical method of concentration. In the particular example given, namely, the extraction of vanadium, the vanadium-containing acid solution may have its acidity controlled to favor the passage of the pentavalent vanadium into the organic solvent. After separation of this solvent from the acid solution, such solvent may be contacted with water to permit the passage of the vanadium from the organic liquid to the water layer. The vanadium in the water phase may then be reduced to a lower valence state by chemical means, such for example, by utilizing a reducing agent, or such change in valence may be effected electrically, so as to concentrate the extracted metal value therein.

It will be appreciated that in the first stage of the process, namely, in the oxidation of vanadium to a higher valence state, electrical methods may be employed. Similarly, as will be appreciated, electrical methods may be utilized for the subsequent reduction, i. e., for the reduction of the vanadium in the water solution. As those skilled in the art will appreciate, these two steps may economically be carried out in the same electrolytic cell in which the anode is separated from the cathode by a diaphragm. In such an apparatus, the voltage drop will then be due to the resistance of the solution and the diaphragm, for a reversible reaction will be taking place.

Those skilled in the art will readily understand that the broad methods described herein are not limited to use with phosphoric acid solutions of the specific type mentioned. Such methods, or equivalent methods, may be employed, for example, to recover vanadium from vanadium ores by digesting or leaching these ores with a suitable acid and then extracting the vanadium in the manner described.

Again, the principle of separating vanadium or equivalent metal values from iron, in the system containing these two, by utilizing selective solvent for the iron compounds in the system, is of broad or general application and not restricted to treatment of the particular type of solution herein mentioned.

It will be understood that the present invention provides a novel system of separating metal compounds, such as vanadium compounds, from liquid systems containing them. Similarly, the invention provides a simple and effective method of separating plural metal values, as illustrated in the typical case, in the separation of vanadium from iron. Since this new method involves the use of an organic extractant which may be economically recovered and recycled in the system, the operative cost in the treatment is very low.

While typical examples, practically embodying the invention in a commercial method, have been described, it will be understood that these are given to explain and illustrate the principles involved in the inventive concept, and not as restricting the scope of the invention to the particular metal values described or to the particular solvent chosen. The invention is conceived to reside in the concept of utilizing the principle of preferential solvent extraction of analogous metal values from equivalent liquid systems by similarly functioning organic solvents.

It is intended to be understood that by the phrase "recovery of vanadium," as used herein, the recovery of metallic vanadium, per se, is not meant. The recovery described and claimed is of a compound or compounds of vanadium.

The term "organic solvents," as used in the claims, is to be interpreted as defining those liquid organic compounds which are substantially immiscible with water and non-reactive with the solutions employed; and which have a preferential affinity for the metallic value to be extracted.

We claim:

1. A method of recovering a compound of vanadium from phosphoric acid solutions which comprises, converting the vanadium to the pentavalent state, extracting the vanadium with an organic solvent, and recovering the vanadium from the organic solvent.

2. A method of recovering a compound of vanadium from phosphoric acid solutions which comprises, converting the vanadium to the pentavalent state, contacting the solution with an organic solvent which has a preferential affinity for vanadium to abstract the vanadium from the solution, segregating the solvent from the solution and recovering the vanadium from the solvent phase.

3. A method of recovering a compound of vanadium from phosphoric acid solutions containing vanadium values, which comprises: converting the vanadium value to its pentoxide; intimately contacting said pentoxide with an organic solvent at temperatures sufficiently elevated, and for a period of time sufficiently prolonged, to insure extraction of the vanadium values by the solvent; separating the solvent phase from the acid phase and distilling the solvent to recover a vanadium compound.

4. A method of recovering a compound of vanadium from phosphoric acid solutions which comprises, converting the vanadium content to vanadium pentoxide, filtering the solution to recover a quantity of the vanadium pentoxide; extracting the filtrate with an organic solvent and recovering the vanadium value from the organic solvent.

5. A method of producing a compound of vanadium from vanadium containing phosphates which comprises, acidulating the phosphates with sulphuric acid to produce phosphoric acid containing vanadium, oxidizing the vanadium content to the pentavalent state, then contacting the solution with an organic solvent and recovering the vanadium content from the organic solvent.

6. A method of recovering a compound of vanadium from phosphoric acid solutions which comprises, converting the vanadium content to vanadium pentoxide, removing the precipitated pentoxide from the solution; and extracting the solution with an organic solvent to recover an additional quantity of the vanadium.

7. A method of recovering a compound of vanadium from vanadium-containing materials which comprises, dissolving the vanadium in phosphoric acid; oxidizing the vanadium to its pentavalent state; abstracting the vanadium from the acid by means of a selective organic solvent and separating the vanadium from the organic solvent phase.

8. A method of recovering a compound of vanadium from phosphoric acid solutions which comprises, adding an oxidizing agent to the solution to convert the vanadium to the pentavalent state; selectively extracting the vanadium from the solution with an organic solvent and subsequently removing the vanadium from the organic solvent.

9. A method of recovering a compound of vanadium from phosphoric acid solutions which comprises converting the vanadium content to the pentavalent state and extracting the vanadium from the solution with an ether.

10. A method of recovering a compound of vanadium from phosphoric acid solutions which comprises, converting the vanadium to the pentavalent state and extracting the solution with isopropyl ether.

11. A method of producing phosphoric acid from vanadium-containing phosphates which comprises, acidulating such phosphates with sulphuric acid to produce phosphoric acid containing vanadium; adding an oxidizing agent to the acid to convert the vanadium to vanadium pentoxide; separating the insoluble fraction of the pentoxide from the acid; then extracting the acid with an organic solvent and subsequently separating the vanadium from the solvent to recover additional amounts of vanadium.

12. A method of producing phosphoric acid from vanadium-containing phosphates which comprises, acidulating such phosphates with sulphuric acid to produce phosphoric acid containing vanadium; adding an oxidizing agent to the acid to convert the vanadium to vanadium pentoxide; separating the insoluble fraction of the pentoxide from the acid and extracting the acid with an ether to recover additional amounts of vanadium.

13. A method of recovering a compound of vanadium from phosphoric acid solutions which comprises, heating the acid in the presence of an oxidizing agent to a temperature of approximately 120° C. whereby the vanadium in said solution is oxidized to its pentavalent state then extracting the solution with an organic solvent, and subsequently removing the vanadium from the organic solvent phase.

14. A method of recovering a compound of vanadium from phosphoric acid solutions which comprises, heating the acid in the presence of an oxidizing agent at an elevated temperature, filtering the solution, then extracting the filtrate with an organic solvent and subsequently recovering the vanadium from the organic solvent.

15. A method of recovering a compound of vanadium from phosphoric acid solutions which comprises, heating the acid in the presence of an oxidizing agent at an elevated temperature to convert the vanadium to the pentavalent state; filtering the solutions; extracting the filtrate with an organic solvent; and distilling the organic solvent to a recover a residue containing vanadium.

16. A method of recovering vanadium metal values as a compound of vanadium, from phosphoric acid solutions containing such values in a pentavalent state, comprising selectively extracting the solution with an aliphatic ester.

17. A method of recovering vanadium metal values as a compound of vanadium, from phosphoric acid solutions containing such values in a pentavalent state, comprising selectively extracting such solution with an organic compound containing a carbonyl group.

18. A method of recovering vanadium metal values as a compound of vanadium, from phosphoric acid solutions containing such values in a pentavalent state which comprises, selectively extracting such values with an organic solvent, separating the solvent from the acid solution, contacting the separated solvent with water to extract the metal values from the organic solvent, and subsequently recovering the metal values from the water phase.

19. A method of recovering vanadium metal values as a compound of vanadium, from phosphoric acid solutions containing such values in a pentavalent state, which comprises, selectively extracting such values with an organic solvent and subsequently re-extracting such values from the organic solvent with water.

20. A method of recovering vanadium metal values as a compound of vanadium, from phosphoric acid solutions containing such values in a pentavalent state, which comprises, selectively extracting such values with an organic solvent, separating the solvent from the acid solution, contacting the solvent with water to extract the metal values from the solvent, and changing the valence of the metal values in the water phase to insure the extraction of additional quantities of such metal values from the solvent.

ARTHUR W. HIXSON.
RALPH MILLER.